United States Patent [19]

Weiss

[11] Patent Number: 5,072,617

[45] Date of Patent: Dec. 17, 1991

[54] FIBER-OPTIC LIQUID LEVEL SENSOR

[75] Inventor: Jonathan D. Weiss, Albuquerque, N. Mex.

[73] Assignee: The United States of America as represented by the United States Department of Energy, Washington, D.C.

[21] Appl. No.: 605,609

[22] Filed: Oct. 30, 1990

[51] Int. Cl.⁵ .............................................. G01F 23/16
[52] U.S. Cl. ........................................ 73/299; 73/293; 73/715
[58] Field of Search ........................... 73/293, 299, 715

[56] References Cited

U.S. PATENT DOCUMENTS

| | | | |
|---|---|---|---|
| 3,580,082 | 5/1971 | Stack et al. | 73/715 X |
| 3,590,640 | 7/1971 | Cindrich | 73/715 |
| 3,713,338 | 1/1973 | Kind | 73/293 |
| 4,048,855 | 9/1977 | Sejournet | 73/299 |
| 4,227,410 | 10/1980 | Ruben et al. | 73/301 |
| 4,521,683 | 6/1985 | Miller | 73/715 X |
| 4,809,589 | 3/1989 | Bertrand | 73/715 X |

OTHER PUBLICATIONS

Pressure Sensing Diaphragm Assemblies, Kearflex Engineering Co., Bulletin No. 461C (from 1951).
J. A. Morris and C. R. Pollack, "A Digital Fiber-Optic Liquid Level Sensor," Journal of Lightwave Technology, vol. LT-5, No. 7, pp. 920-925.
C. P. Yakymyshyn and C. R. Pollack, "Differential Absorption Fiber-Optic Liquid Level Sensor," J. Lightwave Technol., vol. LT-5, Jul. 1987, pp. 941-946.
T. G. Giallorenzi, et al., "Optical-Fiber Sensors Challenge the Competition," IEEE Spectrum, Sep. 1986, pp. 44-49.
M. A. Belkerdid, et al., "Fiber Optic Fluid Level Sensor," SPIE vol. 566 Fiber Optic and Laser Sensors III, 1985, pp. 153-158.
A. R. Tebo, "Sensing with Optical Fibers: An Emerging Technology," Electro-Optical Systems Design, Feb. 1982, pp. 39-45.

Primary Examiner—Daniel M. Yasich
Attorney, Agent, or Firm—George H. Libman

[57] ABSTRACT

A fiber-optic liquid level sensor measures the height of a column of liquid through the hydrostatic pressure it produces. The sensor employs a fiber-optic displacement sensor to detect the pressure-induced displacement of the center of a corrugated diaphragm.

8 Claims, 3 Drawing Sheets

FIBER-OPTIC LIQUID LEVEL SENSOR

The United States Government has rights in this invention pursuant to Contract No. DE-AC04-76DP00789 between the Department of Energy and American Telephone and Telegraph Company.

BACKGROUND OF THE INVENTION

This invention relates to a liquid level sensor and, more particularly, to a liquid level sensor that uses fiber optics to measure the center displacement of a corrugated diaphragm fiber.

The detection of liquid level is one of many functions for which fiber-optic sensors are more suitable than their electrical counterparts, especially in noisy or hostile environments. Much commercial attention has been focused on a simple on-off liquid-level switch which senses the sudden increase in optical radiation loss from an uncladded, bent optical fiber making contact with a liquid. An array of such "point" sensors may be used to detect a number of discrete levels; however, such a system cannot provide a continuous indication of liquid level.

Various other sensors are known in the art for measuring liquid level, either discretely or continuously. While often ingenious, the commercial potential of these sensors may be limited if: (1) they require fibers or other optical components to be immersed in the liquid, which immersion could modify the optical characteristics of the fiber as a result of "wetting" or corrosion; (2) they require light to pass through a liquid whose refractive or absorptive properties effect the operation of the sensor (thereby limiting their operation with certain liquids, especially opaque ones); or (3) they are complex and rely on components which are not common in the fiber-optics industry. Simplicity, availability of components, and low cost are highly attractive features of any commercially viable sensor.

SUMMARY OF THE INVENTION

It is an object of this invention to provide a continuous measure of liquid level using a system that does not rely on the optical properties of the liquid, and does not require any optical component to contact the liquid.

It is a further object of this invention to measure liquid level by detecting the hydrostatic pressure produced by a column of liquid.

It is also an object of this invention to use a fiber-optic pressure gauge for detecting the hydrostatic pressure produced by a column of liquid.

It is another object of this invention to use a corrugated diaphragm to deflect under hydrostatic pressure produced by a column of liquid.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a liquid level sensor comprising a pressure sensor for sensing the pressure head of liquid above the sensor. In the preferred embodiment, a diaphragm having an edge portion surrounding a central portion is mounted by its edge portion with only one side of the diaphragm in contact with the pressure exerted by a depth of liquid. Means for measuring the deflection of the other side of the diaphragm caused by pressure exerted on said one side, preferably fiber optic means, provide an indication of the depth of liquid surrounding the sensor. The diaphragm is preferably corrugated to provide a more proportional reading of pressure as a function of depth.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

The sensor principle of this invention is based on the principle of detecting the pressure exerted by a column of liquid on a pressure sensor, and correlating that pressure reading to the height of the liquid column. In a preferred embodiment, pressure-induced displacement of the center of a diaphragm caused by the pressure of a liquid on one side of the diaphragm provides an indication of liquid pressure.

Although the invention is conceptually simple, a practical problem for implementation is to find a pressure transducer that is impervious to the liquid and sensitive enough to small changes in pressure caused by small changes in liquid level to provide a meaningful output.

Figure 1:
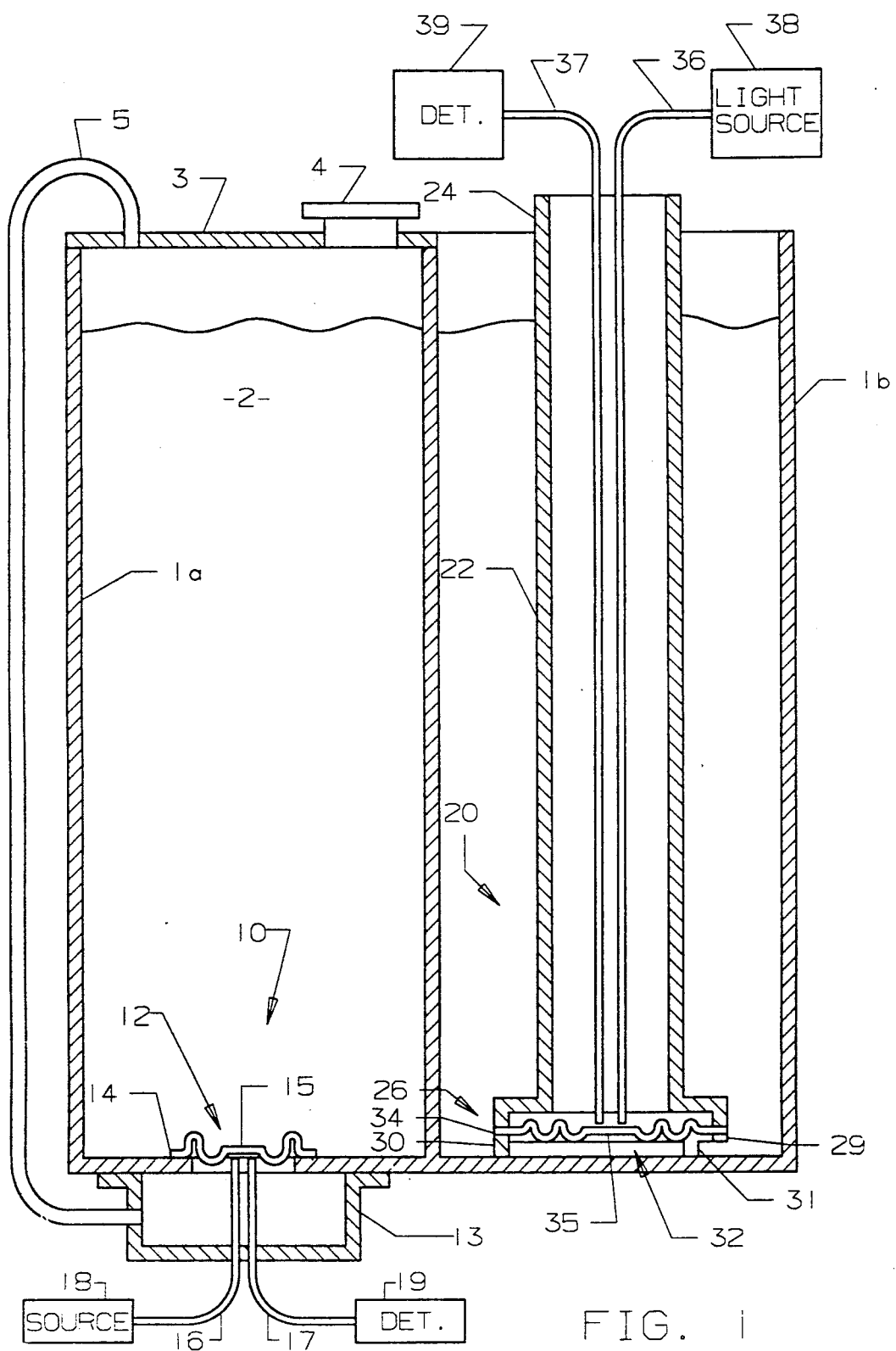
FIG. 1 is a schematic view of two embodiments of the invention.

FIG. 1 shows two embodiments of the invention. A tank 1a has a closed top 3 with a filler cap 4. The depth of liquid 2 in tank 1a is measured by sensor 10. Tank 1b has no cover; the depth of liquid 2 in this tank is measured by sensor 20.

In embodiment 10, a thin, preferably corrugated, diaphragm 12 has an edge portion 14 sealed to the corresponding edge of an opening 13 at the bottom of tank 1. An optical fiber 16 extends from a light source 18 to a location adjacent and spaced from the dry side of center 15 of diaphragm 12. Another optical fiber 17 extends from adjacent fiber 16 to a light detector 19 having, preferably, an electrical output proportional to the incident optical power transmitted to it by fiber 17. A cover 13 protects the dry side of sensor 10. The air pressure in the air space 6 above liquid 2 is made equal to the pressure on the dry side of sensor 10 by connecting pipe 5. Of course, if air space 6 was vented to the atmosphere, the dry side of sensor 10 could also be vented to the atmosphere to attain the required equal pressure.

The operation of the device is as follows: Liquid pressing against diaphragm 12 causes center portion 15 to move toward the optical fibers. Furthermore, the greater the depth of liquid over diaphragm 12, the more pressure exerted by the liquid and the more deflection of the diaphragm caused by the pressure. Light from source 18 is guided by fiber 16 to center portion 15, where it reflects back to fiber 17 and detection by detector 19. As center portion 15 moves toward the ends of fibers 16 and 17, the amount of reflected light at detector 19 changes. This change in detected light is an indication of liquid depth.

Embodiment 20 is similar to the test apparatus used in the design of this invention. It also would be used when a depth sensor is to be placed in an existing tank without causing a new opening to be formed in the tank.

For this embodiment, a liquid-impervious container such as cylinder 22 extends from a first end above the surface of liquid 2 to a second end 26 where it is sealed to conforming edge 34 of diaphragm 32. Second end 26 is placed adjacent the bottom of tank 1 either by suspending cylinder 22 from the wall of tank 1 by known means, or by use of a base 29. As shown, circular base 29 is fastened to edge 34 of diaphragm 32 opposite end 26 of cylinder 22. A plurality of spaced legs extend from base 29 to the bottom of tank 1. In the figure, legs 30 and 31 are shown, a third leg is cut off by the sectional drawing.

Regardless of this construction, the important consideration is that diaphragm 32 is mounted near the bottom of tank 1 with one side of center portion 35 exposed to the pressure of the liquid, with the other side at constant pressure (such as atmospheric pressure) where light from source 38 is directed on the diaphragm by fiber optic 36 and reflected back to detector 39 through fiber optic 37.

Figure 2A:
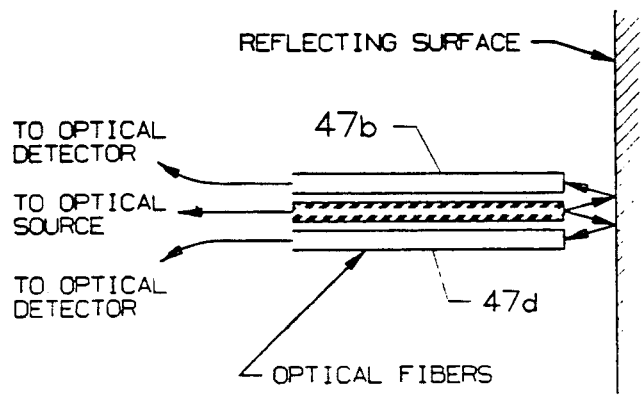
FIGS. 2A and 2B are a detail view of a portion of the embodiments of FIG. 1.
Figure 2B:
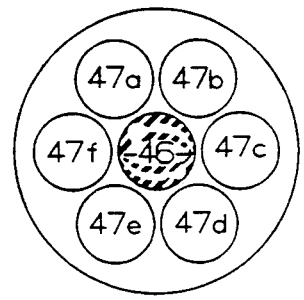

Although only one input and one output optical fiber is shown in each embodiment, FIG. 2A shows a side view, and FIG. 2B a cross-sectional view, of a preferred construction that could be used with either embodiment. As shown in this figure, an input fiber 46 from a light source (not shown) is surrounded by a plurality of output fibers 47a-e for transmitting the reflected light back to a detector (not shown).

Figure 3:
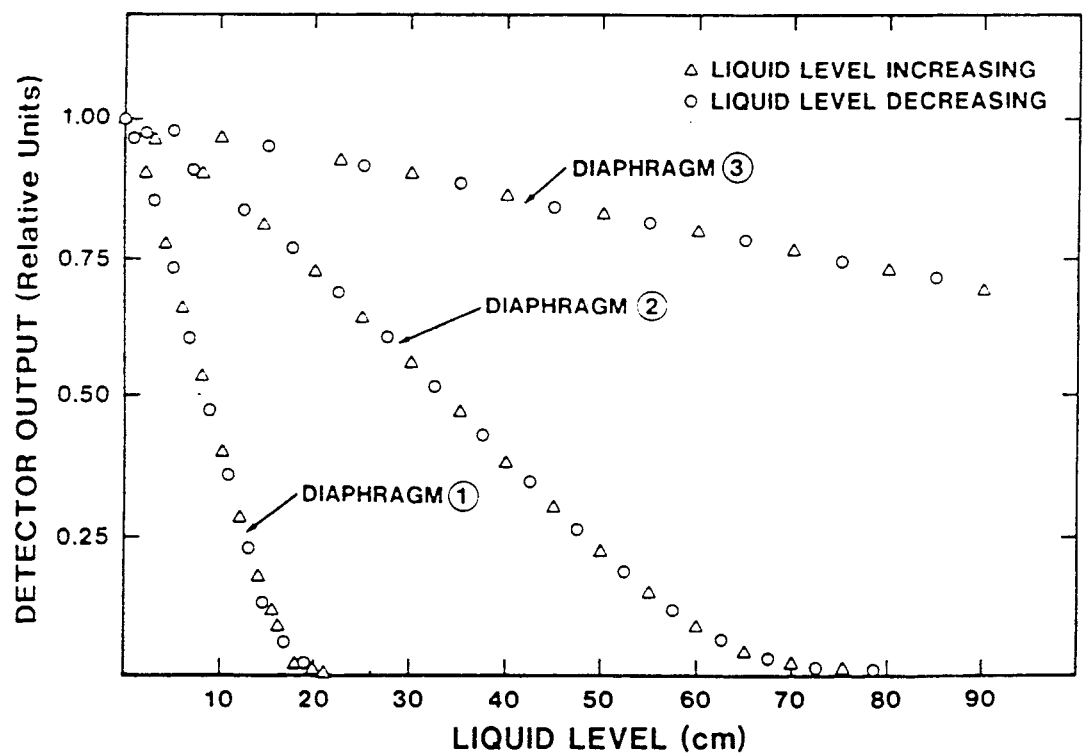
FIG. 3 shows detector output as a function of the spacing of the end of the fibers from the diaphragm.

FIG. 3 shows the results of varying the spacing of the ends of the optical fibers from the diaphragm center. A cable of plastic fibers having a core diameter of 240 μm and a numerical aperature of 0.46, having an attenuation of about 1.8 db/meter were used, one central fiber being connected to an 815 nm light-emitting diode; another six fibers surrounding the central fiber as shown in FIG. 2 and connected to a p-i-n diode that produced an electrical signal proportional to the intensity of light incident to it. The results show that when the ends of the fibers are too close to the diaphragm, much of the light from one fiber reflects back to itself, and not to the other fiber. Similarly, when the fibers are too far from the diaphragm, geometric divergence reduces the amount of light reflecting into the other fibers. Ideally, the fiber ends are mounted for a no-liquid spacing to the left side of the peak of the curve of FIG. 3, so that liquid pressure pushes the diaphragm towards the fibers along the nearly linear positive slope shown in the Figure.

This invention was tested using pressure sensing diaphragms from Kearflex Engineering Company and designed primarily for use a pressure sensors in instrument applications such as pressure transducers, pressure switches, pressure transmitters, pressure gauges, airspeed indicators and mach indicators. In many such devices the diaphragm is normally flat, but as a result of the low pressures produced by a typical column of liquid (two feet of water produce less than 1 psi), a flat diaphragm of any reasonable diameter would not deflect enough to produce an appreciable optical signal. In addition, the diaphragm response of a flat diaphragm would be highly non-linear with pressure. Accordingly, in the preferred embodiments of this invention, corrugated diaphragms are used to greatly enhance and linearize device its response. Corrugated diaphragms, commercially available for use in pressure cells or switches, have a plurality of concentric corrugations extending from the edge to a flat middle portion.

Three metal corrugated diaphragms having the following physical characteristics were evaluated:

| Diaphragm Number | Thickness (mm) | Working Diameter (mm) |
| --- | --- | --- |
| #1 | .064 | 56 |
| #2 | .076 | 48 |
| #3 | .051 | 19 |

The diameter of the opening defines the working diameter of the diaphragm, as the portion of the diaphragm over the opening is the portion that is able to move in response to liquid pressure, as discussed below.

Figure 4:
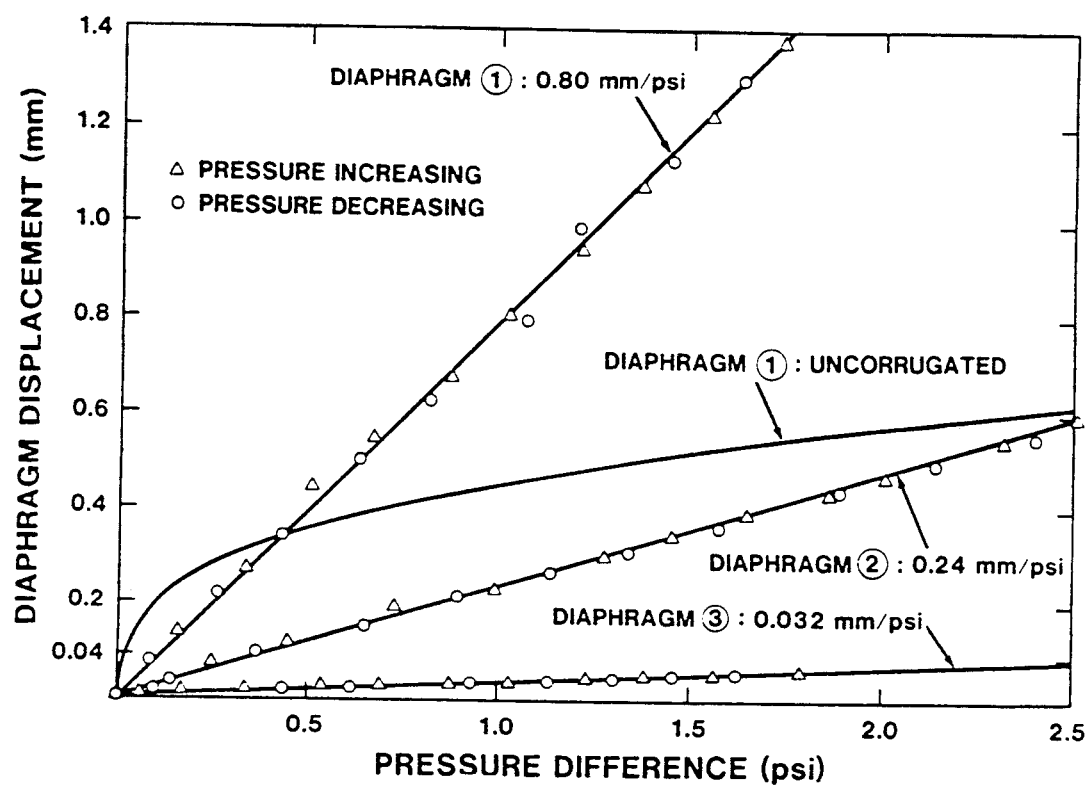
FIG. 4 shows diaphragm displacement as a function of pressure difference.

The deflection of the center of these diaphragms as a function of the pressure difference between their two sides is illustrated in FIG. 4, along with a calculation of how diaphragm #1 would have responded had it not been corrugated. The small, non-linear response over most of the pressure range for the non-corrugated diaphragm is the result of the rapid build-up of membrane stresses in its bulk, as opposed to the flexural state in which diaphragm 1 remains, as a consequence of its corrugations. The experimental data in this figure were obtained by producing a slight vacuum on one side of a given diaphragm and by measuring the deflection with an optical micropositioner. The pressure reduction was determined with a standard electrical pressure transducer.

Figure 5:
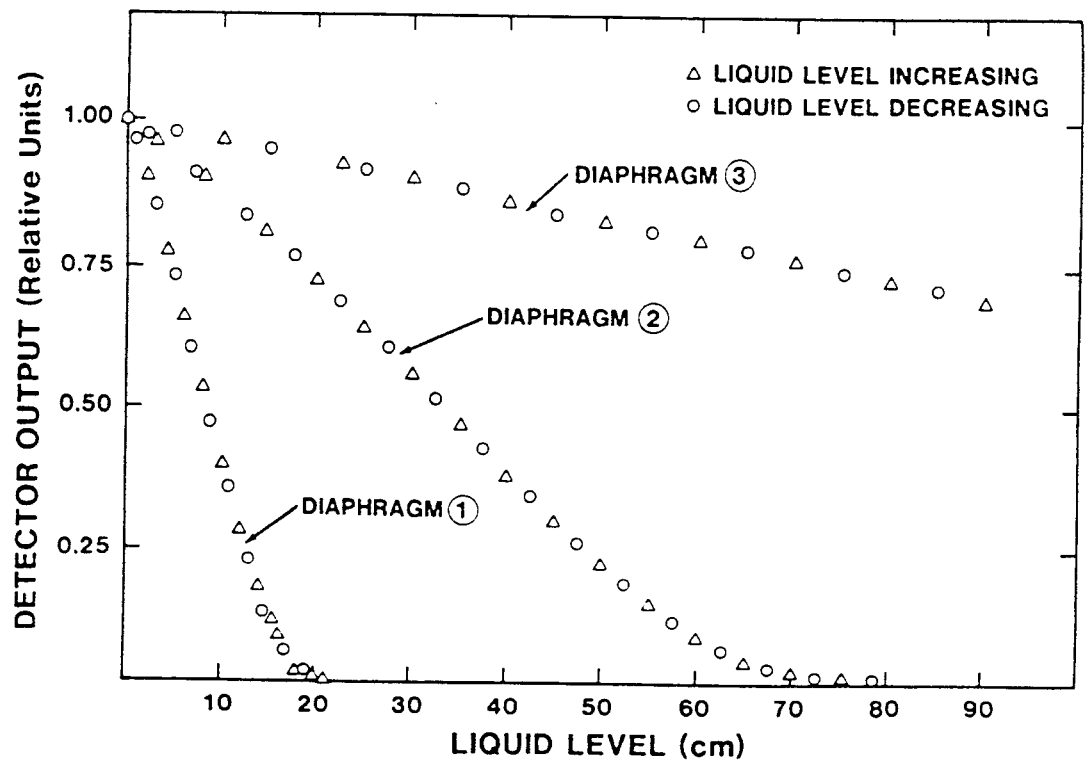
FIG. 5 shows results of one embodiment of FIG. 1 with several diaphragms.
Figure 3:
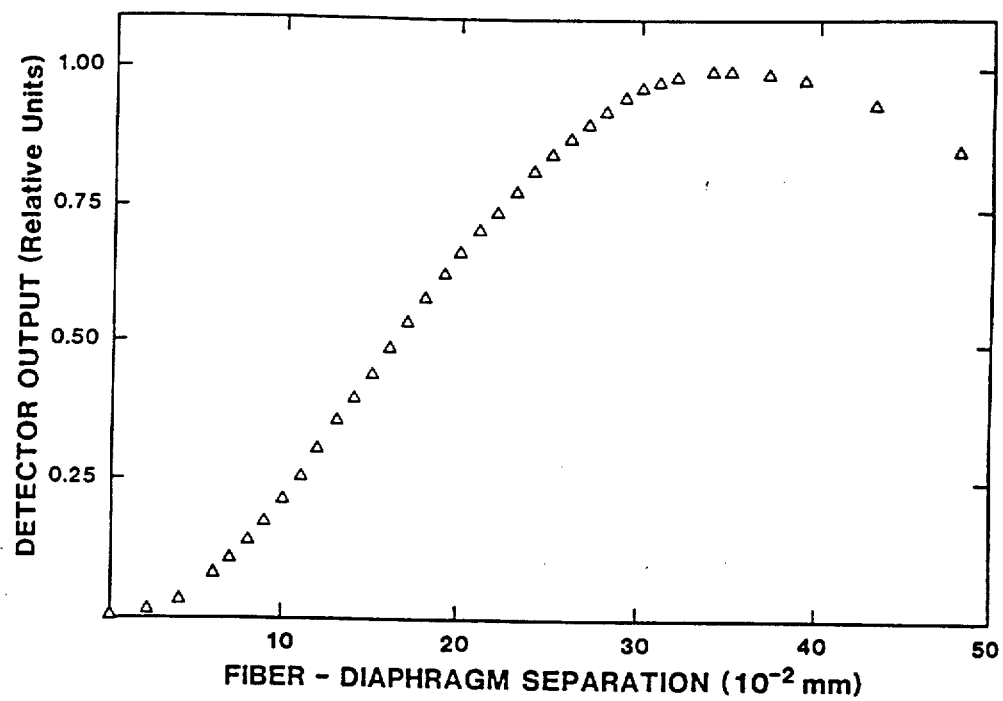

FIG. 5 shows test results of a device similar to the second embodiment of FIG. 1. Using a slip joint (not shown) the ends of the optical fibers were first positioned about 0.25 mm from the middle portion of the diaphragm, a distance essentially 0.1 mm to the left of the peak in the response curve of FIG. 3, the start of the most sensitive and linear region. (Since all of the diaphragms were made of the same material, an alloy known as "NI-SPAN C", and had the same surface roughness, that curve is representative of all the diaphragms.) As seen in the figure, the gauges work as expected. The variation in detector output with water level is simply the relevant portion of FIG. 2, scaled by the diaphragm response and the dependence of pressure on that level.

It is essential that the pressure on the non-liquid side of the diaphragm be the same as that above the liquid, or spurious readings will result. If the top of the tank is not vented to the atmosphere, then the volume surrounding the dry side of the diaphragm must be connected to the top of the tank. A pipe 5 is shown for this purpose in the first embodiment of FIG. 1.

It is well known that analogue fiber-optic sensors are often plagued by drift, sometimes resulting from the temperature or configurational dependence of the microbend or other loss mechanism in the fibers. This effect can be nullified by silvering the end of one of the receiving fibers (or an additional one) and detecting with a separate detector adjacent the system detector 19, 39 the light reflected off its end as a transmission reference. The thermo-mechanical properties of the diaphragm also militate against temperature-induced drift. For example, NI-SPAN C is an alloy specifically designed so that its elastic moduli are insensitive to temperature between −50° F. and 150° F. In addition, its thermal expansion coefficient is quite low, about half that of steel.

Although the disclosed embodiments use inexpensive plastic optical fibers that transmit approximately 28% of the light over a distance of 10 feet, it is contemplated that glass fibers could also be used for remote operations requiring hundreds of feet between the electronics and the sensor.

The particular sizes and equipment discussed above are cited merely to illustrate a particular embodiment of this invention. It is contemplated that the use of the invention may involve components having different sizes and shapes as long as the principle, using a pressure transducer to sense liquid pressure, is followed. The disclosed invention uses inexpensive components and does not have the sensitive optical components submersed in the liquid. It is intended that the scope of the invention be defined by the claims appended hereto.

I claim:
1. A liquid level sensor comprising:
   a container for holding a column of liquid;
   a pressure transducer comprising:
      a corrugated diaphragm having an edge portion surrounding a central portion; and
      mounting means for holding said diaphragm only by said edge portion with only one side of said diaphragm in contact with the pressure head of said column of liquid, movement of said central portion providing a linear mechanical output representative of the hydrostatic pressure exerted at the bottom of said column; and
   output means for measuring said mechanical output and providing an electrical signal representative of the depth of the column of liquid, said output means comprising:
      a light source;
      means for reflecting light from said source from said other side of said diaphragm; and
      means for detecting the intensity of the reflected light from said diaphragm.

2. The liquid level sensor of claim 1 wherein said means for reflecting comprise a first optical fiber having a first end coupled to receive light from said source and a second end adjacent said central portion of said diaphragm.

3. The liquid level sensor of claim 1 wherein said means for detecting comprise a second optical fiber having a first and adjacent said diaphragm to receive reflected light from said central portion, and a second end optically coupled to a light detector.

4. The liquid level sensor of claim 1 wherein said means for detecting comprise a plurality of second optical fibers surrounding said first optical fiber, each of said second fibers having a first end adjacent to said diaphragm to receive reflected light from said central portion, and second ends optically coupled to a light detector.

5. The liquid level sensor of claim 1 wherein said diaphragm edges are sealed to an opening in the bottom of said container by said mounting means.

6. The liquid level sensor of claim 5 wherein said means for measuring the deflection of the other side of said diaphragm are entirely located outside said container.

7. The liquid level sensor of claim 6 wherein said container has a closed top and means for venting the volume between the top of the liquid and the bottom of the container top to the other side of said diaphragm.

8. The liquid level sensor of claim 7 wherein said other side of said diaphragm is enclosed by a cover, and said cover is connected by a pipe to the top of said container.

* * * * *

UNITED STATES PATENT AND TRADEMARK OFFICE
CERTIFICATE OF CORRECTION

PATENT NO. : 5,072,617

DATED : December 17, 1991

INVENTOR(S) : Jonathan D. Weiss

It is certified that error appears in the above-identified patent and that said Letters Patent is hereby corrected as shown below:

The sheet of drawing consisting of figure 3, should be deleted, to be replaced with the attached page Signed and Sealed this Seventeenth Day of August, 1993

*Attest:*

BRUCE LEHMAN

*Attesting Officer*    *Commissioner of Patents and Trademarks*